United States Patent

[11] 3,626,207

| [72] | Inventor | Peter G. Bartlett<br>Davenport, Iowa |
|---|---|---|
| [21] | Appl. No. | 43,877 |
| [22] | Filed | June 5, 1970 |
| [45] | Patented | Dec. 7, 1971 |
| [73] | Assignee | Struthers-Dunn, Inc.<br>Pitman, N.J. |

[54] SOLID-STATE POWER SWITCH
1 Claim, 1 Drawing Fig.

[52] U.S. Cl. .................................................... 307/250,
                                                         307/140
[51] Int. Cl. ......................................................... H03k 17/66
[50] Field of Search.......................................... 307/250,
                                     125, 140, 261; 328/36; 317/146

[56] References Cited
UNITED STATES PATENTS

| 3,254,240 | 5/1966 | Lambourne.................. | 307/250 |
| 3,207,927 | 9/1965 | Wells............................ | 307/250 |
| 2,823,322 | 2/1958 | Trousdale..................... | 307/250 |
| 2,934,637 | 4/1960 | Wilcox......................... | 317/123 DZ |
| 3,161,387 | 12/1964 | Jutier........................... | 317/146 X |
| 3,435,350 | 3/1969 | Powers......................... | 307/261 X |
| 3,246,170 | 4/1966 | Olshan......................... | 307/261 X |

FOREIGN PATENTS

| 766,867 | 1/1957 | Great Britain................ | 307/250 |

*Primary Examiner*—Robert K. Schaefer
*Assistant Examiner*—William J. Smith
*Attorneys*—William D. Hall, Elliott I. Pollock, Fred C. Philpitt, George Vande Sande, Charles F. Steininger and Robert R. Priddy ABSTRACT: A solid-state, power-switch for selectively controlling the energization of a load with either alternating or direct current in response to a low-level signal. The switch comprises an amplifier, an oscillator, a rectifier for converting the output of the oscillator to a direct current signal, and a pair of interconnected power transistors connected in series with the load and the alternating or direct current power supply, and with the latter transistors being responsive to the output of the rectifier to permit a flow of current from the power supply to the load irrespective of the instantaneous polarity of the power supply.

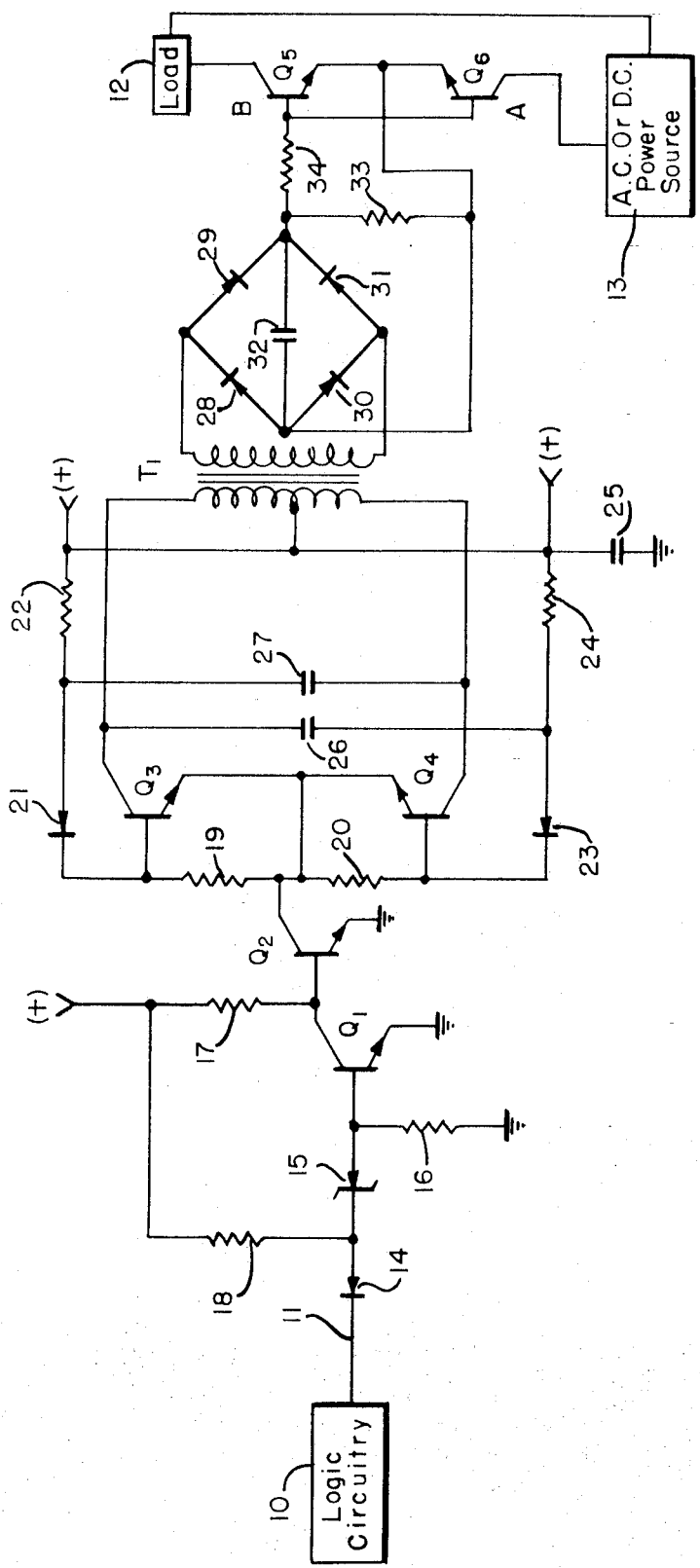

SOLID-STATE POWER SWITCH

BACKGROUND OF THE INVENTION

In electronic control apparatus and systems, it is often necessary to control the switching of an alternating- or direct-current power supply to a load, and with the switching of the power supply to the load being responsive to a low energy level signal of the kind that may be produced by a typical logic circuit. For example, it may be desirable to energize a load drawing a substantial amount of power in response to the presence of a signal voltage of only a few volts amplitude, with the load being deenergized whenever the logic circuitry does not provide such signal voltage. It is of course well known in the art to control a power transistor so that it becomes conductive to energize a load in response to an input signal. However, in such a circuit organization, it is generally necessary that the nature of the power supply be specified, i.e. whether the power supply is one which provides alternating current or, if it is one which provides a direct current, then the polarity of the direct-current power supply relative to the output power transistors must also be predetermined. It is often desired, however, that a control circuit be available which will enable the switching of power selectively to a load irrespective of whether the load is to be energized by alternating or direct current and, if direct current, irrespective of the polarity of such direct-current supply. It is accordingly an object of this invention to provide such a power switch which will operate properly independently of whether the power supply is alternating or direct current and independently also of the particular polarity of the supply in the event that it is a direct-current supply.

SUMMARY OF THE INVENTION

The foregoing objective is met by providing an amplifier which amplifies the low level logic signal, an oscillator which oscillates whenever the logic signal appears, a rectifier which rectifies the oscillator output, and a pair of interconnected transistors whose emitter-collector circuits are series-connected and in series with the load and the power supply for such load, and with the circuit arrangement being such that a circuit can be completed from the power supply to the load, and thence through the series-connected emitter-collector circuits of the two aforementioned power transistors, and with such circuit being capable of completion irrespective of the instantaneous polarity of the output of the voltage supply.

BRIEF DESCRIPTION OF THE DRAWINGS

In describing the invention, reference will be made to the accompanying drawing which comprises a schematic diagram of the power switch of this invention.

DETAILED DESCRIPTION OF THE PREFERRED EMBODIMENT

In the accompanying drawing, the logic circuitry which provides an input for the power switch is illustrated by the block 10. It will be understood that such logic circuitry may be of any well-known kind, and may, for example, be of the kind which is capable of providing on the output lead 11 either a positive voltage or an absence of voltage, and it is desired that the power switch of this invention be operable in response to one kind of output of the logic circuitry 10 to energize a load 12 from a power supply 13 and to provide for a lack of energization of such load 12 when the other kind of output is provided by logic circuitry 10.

Assuming first that the logic circuitry 10 provides a positive voltage output on lead 11, such signal is applied through diode 14 and through zener diode 15 to the base of transistor $Q_1$. The base of transistor $Q_1$ is also connected through a resistor 16 to ground, and the emitter is similarly connected directly to ground. The collector of transistor $Q_1$ is connected through a resistor 17 to the (+) voltage supply, and this same voltage supply is connected through a resistor 18 to the junction of diode 14 and zener diode 15.

The collector of transistor $Q_1$ is also connected to the base of transistor $Q_2$. This transistor has its emitter connected to ground, and its collector connected to the junction of resistors 19 and 20, each of which is connected in the emitter-base circuit of a respective one of the transistors $Q_3$ and $Q_4$. The base of transistor $Q_3$ is connected through a diode 21 and resistor 22 to the (+) voltage source and, similarly, the base of transistor $Q_4$ is connected through a diode 23 and a resistor 24 to the same (+) terminal. Filtering of the supply voltage is provided by capacitor 25. The collectors of the respective transistors $Q_3$ and $Q_4$ are connected through opposite terminals of the primary winding of a transformer $T_1$. The center tap of the transformer is connected to the (+) voltage source. A connection from the collector of transistor $Q_3$ is provided through capacitor 26 to the junction of diode 23 and resistor 24, and a similar connection is made from the collector of transistor $Q_4$ through capacitor 27 to the junction of diode 21 and resistor 22.

The secondary winding of transformer $T_1$ is connected to the input terminals of a full-wave rectifier which includes diodes 28–31, the output of this rectifier being filtered by capacitor 32 and resistor 33. The direct-current filtered output which is thus provided by the rectifier is applied between the emitter and base of each of the power output transistors $Q_5$ and $Q_6$. Between the two collectors of these output transistors is connected in series the load 12 and the power source 13.

In operation, if the logic circuitry 10 provides a zero output, the junction of diode 14 and zener diode 15 is prohibited from rising significantly above zero and under such circumstances transistor $Q_1$ remains turned off. On the other hand, when a positive signal voltage appears on lead 11, diode 14 becomes nonconductive, thereby permitting a positive voltage to appear at the junction of diode 14 and zener diode 15 by reason of the connection of this junction point to the (+) voltage source through resistor 18. As a consequence, transistor $Q_1$ is turned on.

Considering first the operation of the remainder of the circuit under the conditions where transistor $Q_1$ is turned on, the resulting reduction in collector voltage of this transistor biases transistor $Q_2$ to the OFF condition. Consequently, a relatively high voltage appears at the collector of $Q_2$ with the result that the oscillator circuit including transistors $Q_3$ and $Q_4$ is biased in such manner that these transistors are nonconductive so that there are no oscillations. No output voltage is then provided by the output of the fullwave rectifier comprising diodes 28–31, and, accordingly, one or the other of the transistors $Q_5$ and $Q_6$ is nonconductive so that the load 12 cannot be energized from the power source 13.

If, on the other hand, the logic circuitry 10 provides a zero output, the generally opposite conditions prevail with the result that both transistors $Q_5$ and $Q_6$ are conductive and the load is energized. More particularly, with the base of $Q_1$ near zero voltage, the collector of $Q_1$ provides a relatively high voltage to the base of transistor $Q_2$. As a result, transistor $Q_2$ is turned on and provides a relatively low voltage at its collector which is applied to the emitters of both transistors $Q_3$ and $Q_4$. Under these circumstances, transistors $Q_3$ and $Q_4$ are capable of conducting and providing oscillations at a frequency determined by the values of capacitors 26 and 27 and resistors 22 and 24.

The oscillation of transistors $Q_3$ and $Q_4$ will of course produce an output across the secondary winding of transformer $T_1$, thereby producing a direct-current voltage between the collector and emitter of each of the power output transistors $Q_5$ and $Q_6$. As will be described hereinafter, under these conditions both of the transistors $Q_5$ and $Q_6$ will provide, in effect, a closed circuit between the collector and emitter of such transistor so that a series circuit can be completed through the two transistors in series, thereby enabling load 12 to be energized from power source 13.

As previously mentioned, it is desirable that the transistors $Q_5$ and $Q_6$ complete a circuit through their series-connected collector-emitter circuits for energization of the load irrespective of the instantaneous polarity of the voltage provided by power source 13. If this is done, then the power switch can be used to selectively connect a load to a source of direct-current power of either polarity or to a source of alternating-current power.

Assuming that the instantaneous polarity of the power source 13 is such that point B is positive relative to point A, it is then convenient to consider the nominal collector of $Q_6$ as being, in effect, an emitter. Under the assumed polarity condition, transistor $Q_6$ must then be turned on irrespective of whether or not the gating input is applied to the emitter-base circuit of this transistor from the output of the fullwave rectifier because its base is thus now connected to its effective collector. Consequently, the completion of a circuit through the series combination of transistors $Q_5$ and $Q_6$ is then dependent only upon the closure of the circuit between the collector and emitter of transistor $Q_5$ which will occur whenever the base of transistor $Q_5$ becomes positive relevant to its emitter as it will whenever the oscillator is oscillating since the polarity of the fullwave rectifier is chosen to provide a positive base voltage for both transistors $Q_5$ and $Q_6$. Consequently, whenever the oscillator is in operation, transistor $Q_5$ is on and a circuit is then completed to permit energization of load 12 from power source 13.

Under conditions where the polarity of power source 13 is opposite from that just described, i.e. point A positive relative to point B, the exactly opposite conditions prevail with respect to transistors $Q_5$ and $Q_6$. Thus, under such polarity conditions, it can for convenience be considered that the nominal collector of transistor $Q_5$ is, in effect, an emitter. Also, under these assumed polarity conditions, transistor $Q_5$ will be turned irrespective of whether or not a gating voltage is then being derived from the output of the fullwave rectifier. Transistor $Q_6$, however, is controlled in accordance with whether or not it is then receiving a gating voltage applied between its plate and emitter. When it does receive such gating voltage under conditions where the fullwave rectifier is producing an output voltage, then transistor $Q_6$ is turned on to thereby complete a circuit through both transistors $Q_5$ and $Q_6$ so that the load 12 will be energized by power source 13.

The above description assumes that both transistors $Q_5$ and $Q_6$ are of the NPN-type. It will be evident to one skilled in the art that if both these transistors are PNP-type transistors, all of the polarities referred to above must be reversed to obtain the desired operation.

What I claim is:

1. A solid-state power switch for selectively energizing a load from a power source in response to a control signal comprising in combination, a transistor oscillator, first means responsive to said control signal for selectively controlling the operation of said oscillator, second means responsive to the output of said oscillator and including a fullwave rectifier and filtering circuit means for generating a gating signal when said oscillator is operative, two transistors having both their emitters and bases in common, means connecting the series combination of the load and the power source to the collectors of said transistors, and circuit means for applying said gating signal between the common bases and the common emitters of said transistors, whereby a selected one of said transistors dependent upon the instantaneous polarity of the output of said power source is rendered conductive irrespective of whether said gating signal is applied between the common bases and the common emitters of said transistors whereas the other of said transistors is rendered conductive only in response to the application of said gating signal to thereby permit energization of said load from an alternating-current power source and from a direct-current power source irrespective of its polarity.

* * * * *